US009197515B2

(12) United States Patent
Cai et al.

(10) Patent No.: US 9,197,515 B2
(45) Date of Patent: Nov. 24, 2015

(54) IMPLEMENTING RATING TIMER CONTROL IN A PRE-BILLER TO SUPPORT ONLINE AND OFFLINE CHARGING

(75) Inventors: Yigang Cai, Naperville, IL (US); Xiangyang Li, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 2225 days.

(21) Appl. No.: 11/778,250

(22) Filed: Jul. 16, 2007

(65) Prior Publication Data

US 2008/0243655 A1    Oct. 2, 2008

(30) Foreign Application Priority Data

Mar. 30, 2007    (CN) .......................... 2007 1 0091483

(51) Int. Cl.
| | | |
|---|---|---|
| G07F 19/00 | (2006.01) | |
| H04M 15/00 | (2006.01) | |
| H04L 12/24 | (2006.01) | |
| G06Q 30/02 | (2012.01) | |
| G06Q 30/04 | (2012.01) | |
| H04L 12/14 | (2006.01) | |
| G06Q 40/00 | (2012.01) | |
| H04L 12/26 | (2006.01) | |

(52) U.S. Cl.
CPC ........ *H04L 41/5029* (2013.01); *G06Q 30/0283* (2013.01); *G06Q 30/0284* (2013.01); *G06Q 30/04* (2013.01); *H04L 12/14* (2013.01); *G06Q 40/10* (2013.01); *H04L 43/0852* (2013.01)

(58) Field of Classification Search
None
See application file for complete search history.

(56) References Cited

U.S. PATENT DOCUMENTS

| 4,283,772 A | * | 8/1981 | Johnston | 713/600 |
| 7,702,779 B1 | * | 4/2010 | Gupta et al. | 709/224 |
| 2003/0229613 A1 | * | 12/2003 | Zargham et al. | 707/1 |
| 2005/0009500 A1 | * | 1/2005 | Ear | 455/408 |
| 2005/0125305 A1 | * | 6/2005 | Benco et al. | 705/26 |
| 2005/0149365 A1 | * | 7/2005 | Johnson | 705/4 |
| 2007/0036312 A1 | | 2/2007 | Cai et al. | 379/126 |

OTHER PUBLICATIONS

Communication relating to the results of the International Search Report from counterpart International Application No. PCT/US 2008/003639 dated Mar. 20, 2008.
Written Opinion.
Vodafone "Perform envelope reporting in offline CDRs based on requirements from online charging" 3GPP Draft; S5-070555 CR 32299-50 Offline-Charging (3GPP) Mar. 23, 2007 XP050305378 vol. tsg_sa\WG5_TM\TSGS5_52\Docs, no. China; Apr. 2, 2007.

* cited by examiner

*Primary Examiner* — Ryan Zeender
*Assistant Examiner* — Christopher Buchanan
(74) *Attorney, Agent, or Firm* — Davidson Sheehan LLP

(57) ABSTRACT

The present invention provides a method of processing information associated with off-line billed communications in a communications network. The method includes providing at least one charging data record to a rating engine. The charging data record(s) include information associated with at least one off-line communication and are provided in response to receiving the charging data record(s). The rating engine determines costs of the off-line communication(s) at a time determined based on at least one time control category associated with the charging data record(s). The method also includes modifying the charging data record(s) to include information indicative of the cost(s) of the off-line communication(s) determined by the rating engine.

18 Claims, 7 Drawing Sheets

IMPLEMENTING RATING TIMER CONTROL IN A PRE-BILLER TO SUPPORT ONLINE AND OFFLINE CHARGING

This patent application claims priority to the previously filed Chinese Application No. 200710091483.0 which was filed with the Chinese Patent Office on Mar. 30, 2007.

BACKGROUND OF THE INVENTION

1. Field of the Invention

This invention relates generally to communication systems, and, more particularly, to Internet Protocol (IP) Multimedia Subsystem (IMS) communication systems.

2. Description of the Related Art

Service providers typically provide numerous voice and/or data services to subscribers using one or more wired and/or wireless communication systems. Exemplary services include cellular telephony, access to the Internet, gaming, broadcasting or multicasting of audio, video, and multimedia programming, and the like. Mobile subscriber units such as cell phones, personal data assistants, smart phones, pagers, text messaging devices, global positioning system (GPS) devices, network interface cards, notebook computers, and desktop computers may access the services provided by the communication systems over an air interface with one or more base stations. Communication between mobile units and base stations are governed by various standards and/or protocols, such as the standards and protocols defined by the $3^{rd}$ Generation Partnership Project (3GPP, 3GPP2).

The service providers use offline and online billing functions to keep track of the charges incurred by each subscriber unit for using the various services provided by the service provider. The 3GPP standards group has defined a set of specifications that may be used to implement online charging systems and offline charging systems to cover charging in the various network domains (e.g., a circuit switching network domain, a packet switching network domain, and/or a wireless domain), IP multimedia subsystems, and emerging 3G application services. Offline charging is generally defined as a charging mechanism where charging information does not affect, in real-time, the service rendered. In offline charging, charging information for network resource usage is collected concurrently with that resource usage. Online charging is generally defined as a charging mechanism where charging information can affect, in real-time, the service rendered, and therefore a direct interaction of the charging mechanism with session/service control is needed. In online charging, charging information for network resource usage is collected concurrently with that resource usage in the same fashion as in offline charging. However, authorization for the network resource usage must be obtained by the network prior to the actual resource usage to occur.

FIG. 1 conceptually illustrates a charging architecture 100 as defined by the 3GPP. The charging architecture 100 may be found in the technical specification 3GPP TS 32.240. The left part of FIG. 1 illustrates the offline charging system 102 of the charging architecture 100. Offline charging system 102 includes a Charging Data Function (CDF) 110 and a Charging Gateway Function (CGF) 112. The right part of the FIG. 1 illustrates the online charging system (OCS) 104 of the charging architecture 100. The detailed functional components of online charging system 104 may be found in the technical specification 3GPP TS 32.296. Offline charging system 102 and online charging system 104 both transmit charging data records (CDR) to a billing system 106. A CDR is a formatted collection of information about a chargeable event (e.g. time of call set-up, duration of the call, amount of data transferred, etc) for use in billing and accounting. A separate CDR is generated for each party to be charged for parts of (or all) charges of a chargeable event. More than one CDR may therefore be generated for a single chargeable event, e.g. because of its long duration and/or because more than one charged party is to be charged for the event.

Offline charging system 102 communicates with the following elements or functions to receive charging information: a circuit-switched network element (CS-NE) 121, a service network element (service-NE) 122, a SIP application server (AS) 123, Multimedia Resource Function Control (MRFC) 124, Media Gateway Control Function (MGCF) 125, Break out Gateway Control Function (BGCF) 126, Proxy-Call Session Control Function (CSCF)/Interrogate-CSCF (I-CSCF) 127, Serving-CSCF (S-CSCF) 128, Wireless LAN (WLAN) 129, SGSN 130, GGSN, 131, and Traffic Plane Function (TPF) 132. These elements and functions are known to those familiar with the 3GPP specifications. Online charging system 104 communicates with the following elements or functions to receive charging information: circuit-switched network element (CS-NE) 121, service network element (service-NE) 122, SIP application server 123, MRFC 124, S-CSCF 128, Wireless LAN (WLAN) 129, SGSN 130, GGSN, 131, and Traffic Plane Function (TPF) 132. These elements and functions are known to those familiar with the 3GPP specifications.

FIG. 2 conceptually illustrates online charging system 104 as defined by the 3GPP. Online charging system 104 includes Online Charging Functions (OCF) 202. Online charging functions 202 include Session-Based Charging Function 204 and Event-Based Charging Function 206. Online charging system 104 further includes an Account Balance Management Function (ABMF) 208, an online Rating Function (RF) 210, and a Charging Gateway Function (CGF) 212. These elements and functions are known to those familiar with the 3GPP specifications.

FIG. 3 conceptually illustrates a generalization of the charging architecture 100 as defined by the 3GPP to show the operation of the charging architecture 100. Charging architecture 100 includes a Charging Trigger Function (CTF) 302, offline charging system 102, online charging system (OCS) 104, and billing system 106. Both offline charging system 102 and online charging system (OCS) 104 introduce a charging gateway function, which are the charging gateway function (CGF) 112 and the charging gateway function (CGF) 212, respectively. Charging gateway function 112 and charging gateway function 212 both act as gateways between the network and the billing system 106 to provide CDR pre-processing functionality. Offline charging system 102 includes a charging data function (CDF) 110 and charging gateway function 112. Online charging system 104 includes online charging function (OCF) 202, account balance management function (ABMF) 208, an online rating function (RF) 210, and charging gateway function 212. Billing system 106 includes offline rating function (RF) 304.

According to the 3GPP standards, the charging trigger function 302 is the focal point for collecting the information pertaining to chargeable events within a network element (not shown). The charging trigger function 302 in one or more network elements generates charging information for one or more calls. Depending on subscriber provisioned charging characteristics, a charging trigger function 302 transmits offline charging information to the charging data function 110 via an Rf interface 310. A charging trigger function 302 transmits online charging information to online charging system 104 via an Ro interface 311. The online charging system 104 and the offline charging system 102 are typically implemented in parallel. Once the charging information has been received from the charging trigger function 302, the online charging system 104 and the offline charging system 102 operate in different and distinct manner, at least in part because of the different and distinct specifications for online and offline charging.

For offline charging, the charging data function 110 receives the offline charging information for a call or a call session. The charging data function 110 generates a charging data record (CDR) based on the offline charging information. The CDR is unrated at this point. The charging data function 110 transmits the unrated CDR to charging gateway function 112 via Ga interface 312. Charging gateway function 112 preprocesses the unrated CDR, such as for validation, consolidation, error-handling, etc, and filters the unrated CDR. Charging gateway function 112 also temporarily buffers the unrated CDR. Responsive to a request from billing system 106, charging gateway function 112 transmits the unrated CDR to billing system 106 via Bx interface 313, e.g., using the File Transfer Protocol (FTP). The "x" subscript for the Bx interface 313 may be a "c", "p", "i", "l", "m", "o", "w", etc, depending on the network domain. For instance, "c" represents Circuit Switched (CS), "p" represents Packet Switched (PS), "i" represents IP Multimedia Subsystem (IMS), "l" represents Location Service, "m" represents Multimedia Message Service (MMS), "o" represents Online Charging System (OCS), and "w" represents Wireless LAN (WLAN). The billing system 106 includes an offline rating function 304 for determining the rate for offline charging of calls. Billing system 106 accesses the offline rating function 304 to determine a rate for the unrated CDR, and generates a rated CDR for the offline charging of the call session.

For online charging, online charging function 202 includes a session-based charging function 204 and an event based charging function 206 (see FIG. 2). Each function contains a charging data function to generate CDRs. An online charging function 202 (or its corresponding charging data function) receives online charging information from a charging trigger function 302 for a call session. Responsive to the online charging information, online charging function 202 accesses online rating function 210 to determine a rate for the call session associated with the online charging information. The online charging function 202 generates a rated CDR based on the rate for the call session and the online charging information, and transmits the rated CDR to charging gateway function 212 for CDR pre-processing via Ga interface 314, e.g., using the File Transfer Protocol (FTP). Charging gateway function 212 preprocesses the CDRs and filters the preprocessed CDRs. Charging gateway function 212 temporarily buffers the rated CDR. Responsive to a request from billing system 106, charging gateway function 112 transmits the rated CDR to billing system 106 via Bo interface 315.

As discussed above, the existing 3GPP standard specifications treat online charging and offline charging as separate functions that are implemented in parallel. The charging gateway function 112 for the offline charging system 102 can only feed an unrated CDR to the billing system 106 via the Bx interface 313. The billing system 106 thus needs its own independent offline rating function 304 in order to rate offline charges for calls. On the other hand, online charging system 104 includes its own online rating function 210 that rates online charging for calls. The 3GPP standards do not define an interface to enable the charging gateway function 112 for the offline charging system 102 to feed CDRs to online charging system 104 for further rating and balance adjustment. Thus, most service operators need to manage, support, maintain, and update two separate charging systems from different vendors. Maintaining two separate charging systems may increase overhead and reduce the operational efficiency of the communication system.

Cai, et al. (U.S. Pat. No. 7,010,104) describes a pre-biller capability that may be implemented in enhanced charging collection function (CCF) applications. The pre-biller includes an offline charging interface with the online charging system that may be used for call cost calculation based on the CDR. The pre-biller allows the online charging system to calculate costs of offline communications during periods of low online communication, such as off-peak time periods. However, Cai does not specify how the pre-biller controls the time for calculating the call cost at the rating engine or how the online charging system and the rating engine provide the calculated call cost to the pre-biller.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for processing information associated with off-line chargeable events or sessions in a communications network. The method includes providing at least one charging data record to a rating engine. The charging data record(s) include information associated with at least one off-line chargeable event or session and are provided in response to receiving the charging data record(s). The rating engine determines costs of the off-line chargeable event(s) or session(s) at a time determined based on at least one time control category associated with the charging data record(s). The method also includes modifying the charging data record(s) to include information indicative of the cost(s) of the off-line chargeable event(s) or session(s) determined by the rating engine.

In another embodiment of the present invention, a method is provided for processing information associated with off-line chargeable events or sessions in a communications network. The method includes receiving, from a pre-biller, at least one charging data record including information associated with at least one off-line chargeable event or session. The charging data record(s) are provided in response to the charging data record(s) being received at the pre-biller. The method also includes determining at least one cost of the off-line chargeable event(s) or session(s) at a time determined based on at least one time control category associated with the charging data record(s) and providing information indicative of the determined cost(s) to the pre-biller.

BRIEF DESCRIPTION OF THE DRAWINGS

The invention may be understood by reference to the following description taken in conjunction with the accompanying drawings, in which like reference numerals identify like elements, and in which.

Figure 1:
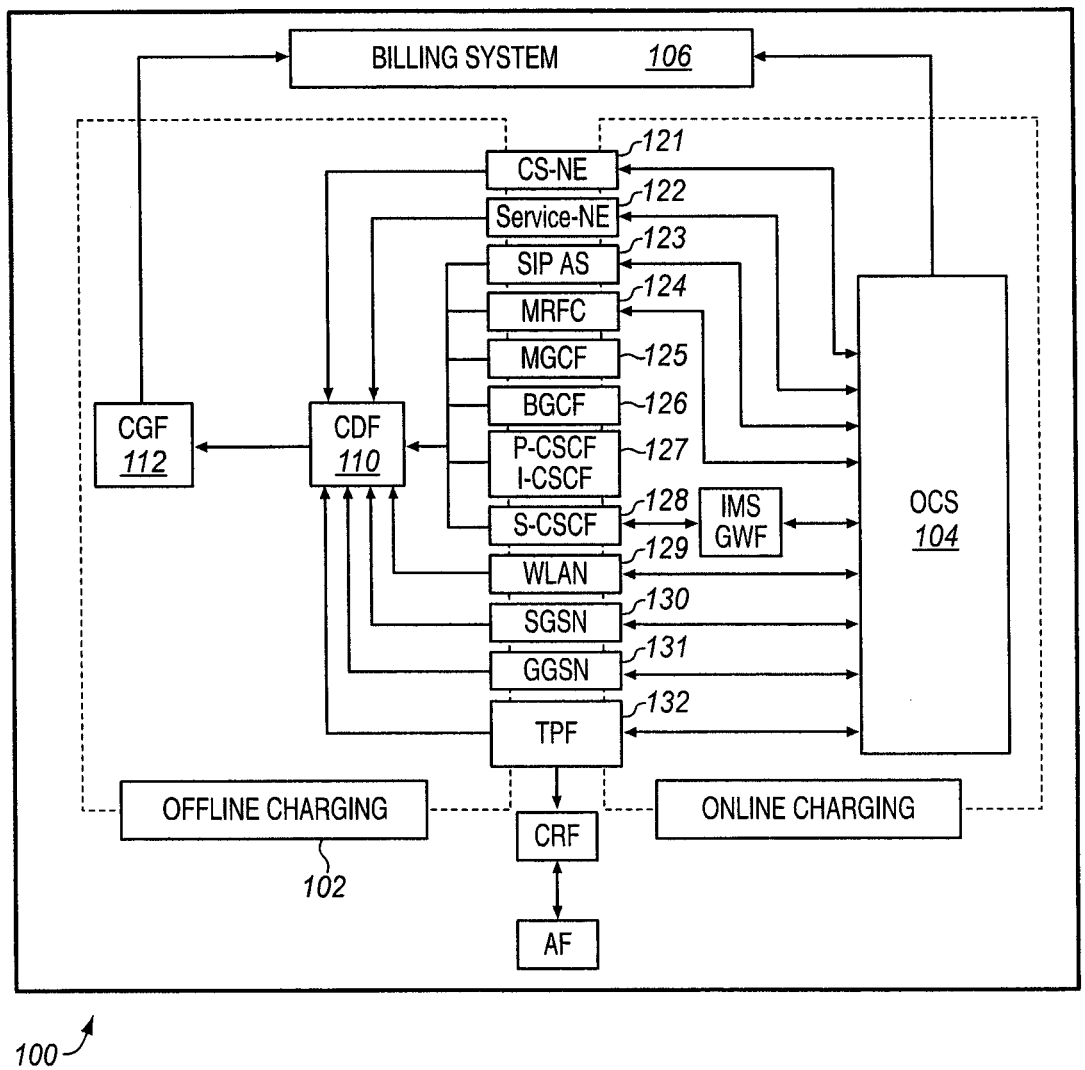
FIG. 1 conceptually illustrates a charging architecture as defined by the 3GPP.
Figure 2:
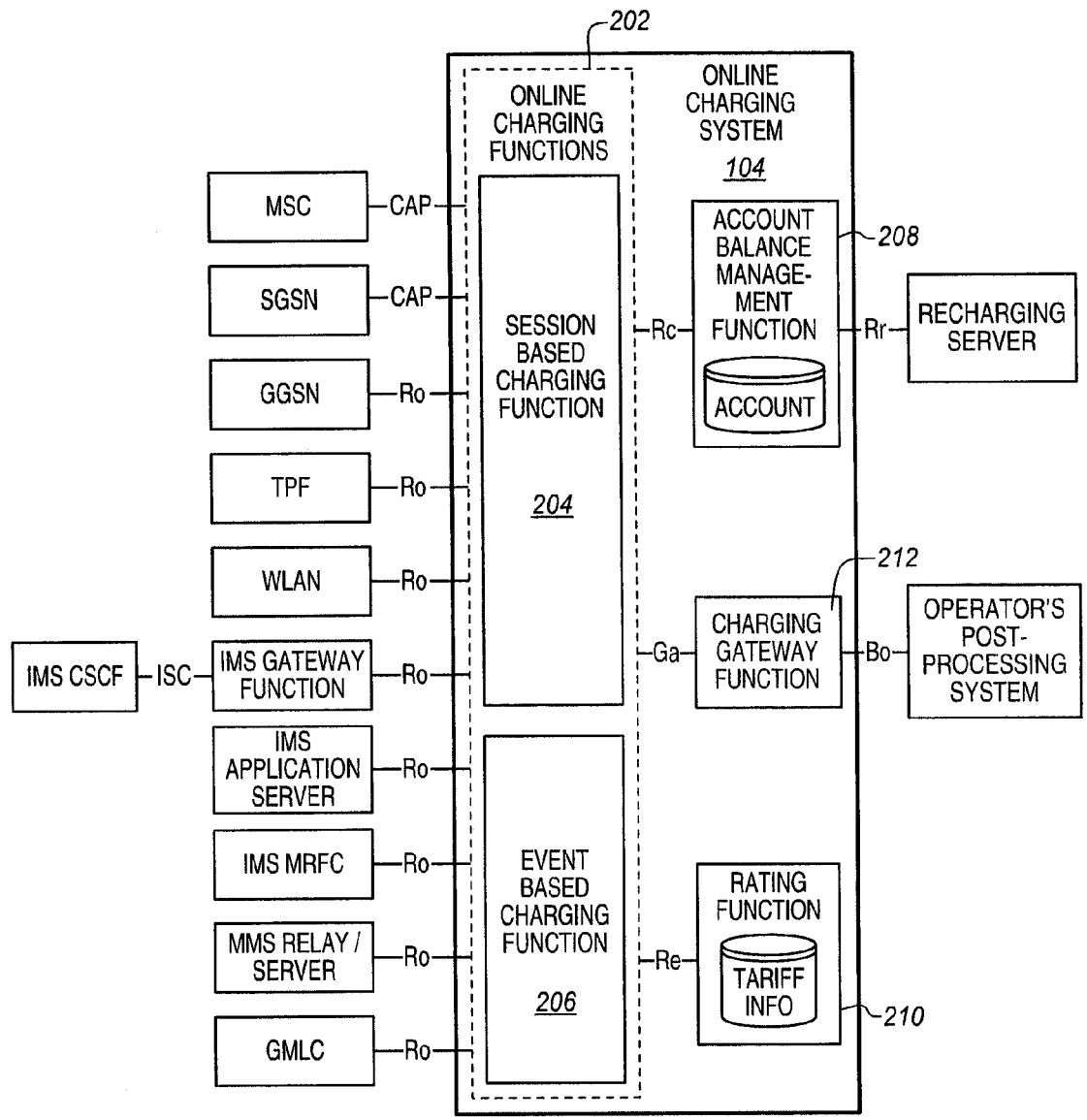
FIG. 2 conceptually illustrates online charging system as defined by the 3GPP.
Figure 3:
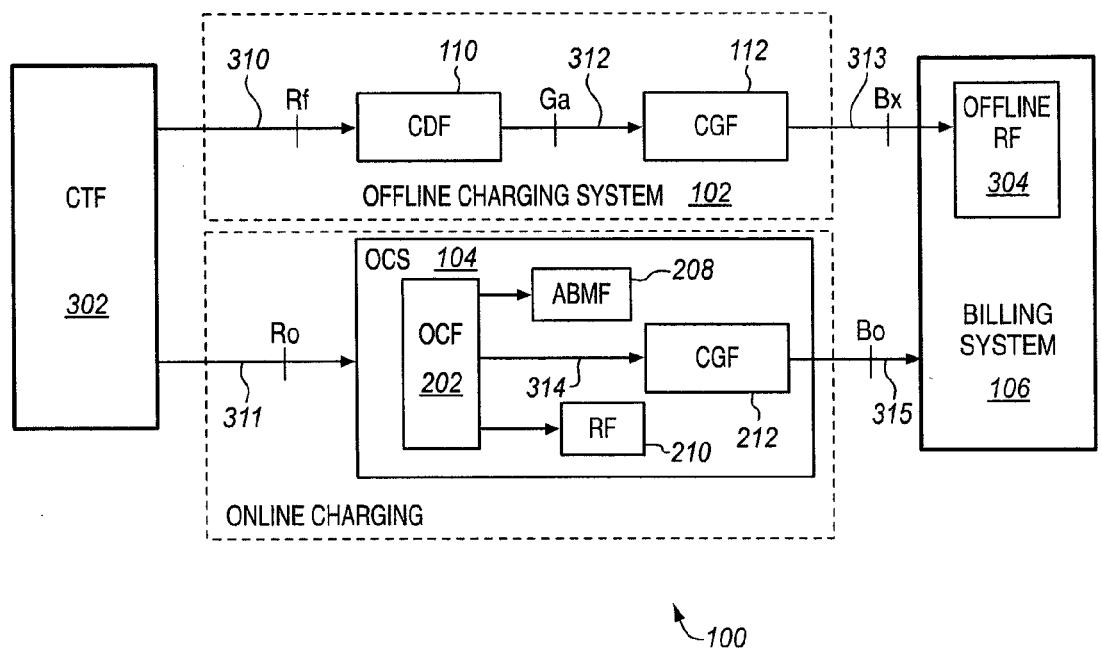
FIG. 3 conceptually illustrates a generalization of the charging architecture as defined by the 3GPP to show the operation of the charging architecture.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 4:
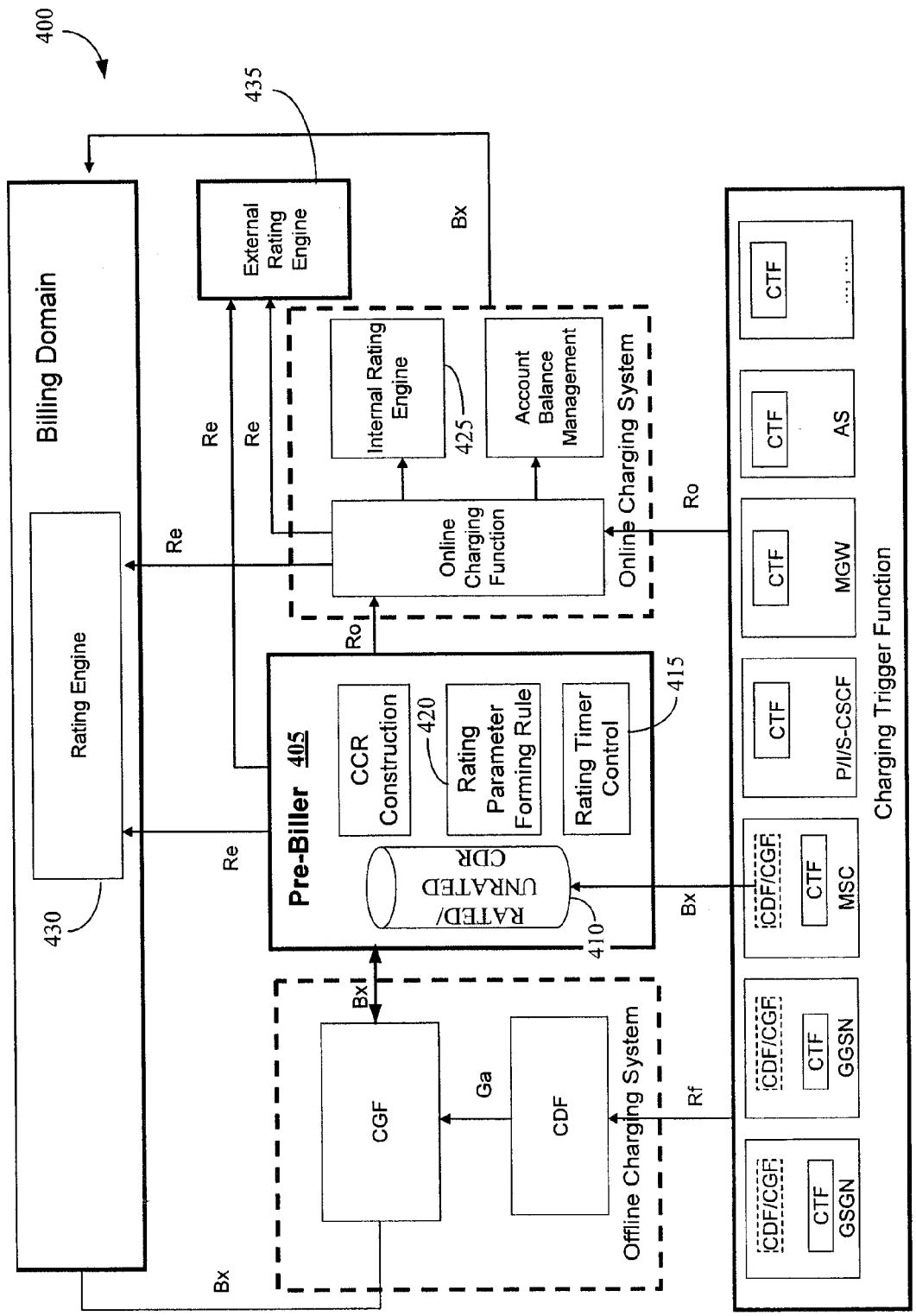
FIG. 4 conceptually illustrates a first exemplary embodiment of a charging architecture, in accordance with the present invention.

FIG. 4 conceptually illustrates a first exemplary embodiment of a charging architecture 400. In the illustrated embodiment, the charging architecture 400 includes an offline charging system and an online charging system. The offline charging system includes a Charging Data Function (CDF) and a Charging Gateway Function (CGF). The online charging system (OCS) includes an online charging function and an account balance management function. The charging architecture 400 also includes a charging trigger function and a billing domain. Techniques for implementing and operating the online and off-line charging systems, the charging trigger function, and the billing domain are known in the art and in the interest of clarity only those aspects of operating the online and/or off-line charging systems, the charging trigger function, and/or the billing domain that are relevant to the present invention will be discussed further herein.

The offline charging system and the online charging system are both capable of forming charging data records (CDR) using information provided by the charging trigger function. A CDR is a formatted collection of information about a chargeable event (e.g. time of call set-up, duration of the call, amount of data transferred, etc) and/or a chargeable session (e.g. time of session initiation, duration of the session, amount of data transferred during the session, etc) for use in billing and accounting. A separate CDR is generated for each party to be charged for parts of (or all) charges incurred by (or during) a chargeable event and/or session. More than one CDR may therefore be generated for a single chargeable event and/or session, e.g. because of its long duration and/or because more than one charged party is to be charged for the event. In one embodiment, the CDRs formed by the off-line charging system may not include information indicating the costs associated with the associated chargeable event and/or session. These CDRs may be referred to as unrated CDRs.

The charging architecture 400 includes a pre-biller component 405 that is deployed (in a functional sense and possibly also in a physical sense) between the off-line charging system and the online charging system. The pre-biller component 405 may be implemented in hardware, firmware, software, or any combination thereof. In various alternative embodiments, the pre-biller component 405 could be physically implemented as a standalone box or it could reside in other entities such as the CCF, CDF, SGSN, GGSN, GGSN, IMS CSCF/AS, or a media gateway box. In the illustrated embodiment, the pre-biller component 405 receives CDRs, such as unrated CDRs, from the CGF in the off-line charging system and/or from the charging trigger function. For example, the CDRs may be received over the Bx interface. The CDRs may then be stored in a CDR repository 410, which may be implemented in one or more memory elements. In various alternative embodiments, the pre-biller component 405 may also collect the CDRs from other CGF nodes, which can be located in the offline charging system or in elements of a legacy core network, such as the SGSN, GGSN, MGW, etc.

The pre-biller component 405 includes a rating timer control mechanism 415 that is used to determine when to calculate the cost of the chargeable event and/or session associated with the CDRs received by the pre-biller component 405. In one embodiment, the rating timer control mechanism 415 determines whether the cost of the chargeable event and/or session should be determined in real-time, near-real-time, or not in real-time. The particular latency and/or delay implied by the categories real-time, near real time, and non-real-time may be different in different implementations of the rating timer control mechanism 415. However, in one embodiment, real-time implies a latency or delay that is less than one second and near real-time implies a latency or delay that is less than one minute. Non-real time may imply that the cost may be calculated at the discretion of the rating timer control mechanism 415, e.g., during periods of low (actual and/or expected) online billing activity.

In the illustrated embodiment, the pre-biller component 405 implements rating parameter forming rules 420 that are used to determine the timer category of the chargeable events and/or sessions. The charging rules may be used to determine which service costs should be computed using real-time, near real time or non real-time rating control by associating different service types with different timer control categories. For example, the costs of voice and data calls may be computed in non real time mode and the costs of m-commerce calls may be computed in real time mode. For another example, the costs of a call that occurred in a home network may be calculated in real-time mode and the costs of a call that occurred in the roaming network may be computed in the near-real time mode. For yet another example, the costs of a call placed by a prepaid subscriber may be calculated in the real-time mode and the costs of a call placed by a post-paid subscriber may be performed in the non real time mode. However, persons of ordinary skill in the art having benefit of the present disclosure should appreciate that this list of charging rules that may be associated with service types is intended to be illustrative of possible charging rules and is not intended to be an exhaustive or limiting list of the charging rules.

Rating engines 425, 430, 435 may be used to calculate the costs associated with the chargeable events and/or sessions indicated in the CDRs provided by the online and/or offline charging systems. In the illustrated embodiment, the online charging system includes an internal rating engine 425, the billing domain includes a common rating engine 430, and an external rating engine 435 is also included in the charging architecture 400. Persons of ordinary skill in the art having benefit of the present disclosure should appreciate that these rating engines 425, 430, 435 are intended to illustrate potential locations for the rating engines 425, 430, 435. However, not all of the rating engines 425, 430, 435 shown in FIG. 4 may be present in all implementations of the charging architecture 400.

Figure 5:
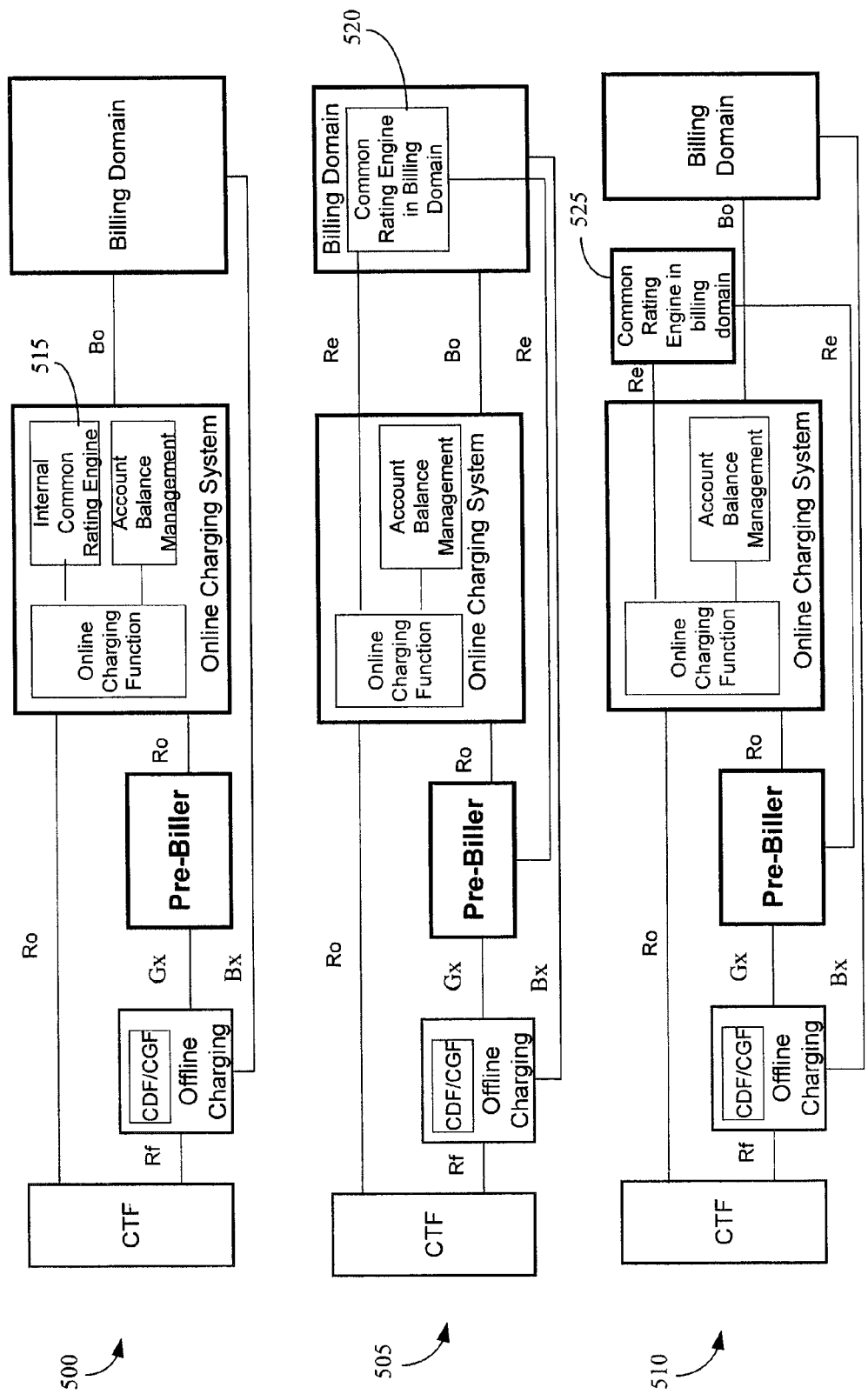
FIG. 5 conceptually illustrates three examples of alternate charging architectures, in accordance with the present invention.

FIG. 5 conceptually illustrates three examples of alternate charging architectures 500, 505, 510. In the first exemplary embodiment of the charging architecture 500, an internal common rating engine 515 is implemented in the online charging system. The pre-biller communicates with the internal common rating engine 515 over an Ro interface. The common rating engine 515 is internally integrated with the online charging system. The billing domain (BD) doesn't maintain a separate rating engine to calculate call charges.

In the second exemplary embodiment of the charging architecture 505, a common rating engine 520 is implemented in the billing domain. The pre-biller communicates with the common rating engine 520 over an Re interface. The online charging system performs charging control based on subscriber account information instead of maintaining a rating engine component. For online charging calls, the OCS interacts with the rating engine 520 in the billing domain via the Re interface to determine the predicted call quota based on the subscriber credit and to calculate the call cost based on actual call usage. For the offline charging call, the pre-biller may send the charging information via Re interface to the rating engine 520 in the billing domain to calculate the call cost.

In the third exemplary embodiment of the charging architecture 510, a common rating engine 525 is implemented external to the online charging system and the billing domain. The common rating engine 525 is still in the online charging domain, but it is implemented in a separate box. For online charging calls, the OCS interacts with the rating engine 525 via an Re interface to determine the predicted call quota based on the subscriber credit, and calculate the call cost based on actual call usage. For the offline charging call, the pre-biller sends the charging information via Re interface to the rating engine 525 in the billing domain to calculate the call cost.

Referring back to FIG. 4, the rating engine(s) 425, 430, 435 may be used to calculate call costs for online chargeable events and/or sessions. The online charging system may consult the rating engine(s) 425, 430, 435 at call establishment to immediately determine and reserve the granted call quota based on the subscriber account balance credit. At the call end, the online charging system consults the rating engine(s) 425, 430, 435 to immediately calculate the call cost based on the actual call usage. The rating engine(s) 425, 430, 435 may operate in the real-time mode for the online charging.

The rating engine(s) 425, 430, 435 may also calculate the cost of off-line chargeable events and/or sessions. These costs are calculated at a time determined based upon the rating timer control category associated with the chargeable event and/or session. For example, the rating engines 425, 430, 435 may perform real time charging without latency if the offline chargeable event and/or session is associated with the real-time rating control category. The pre-biller component 405 may therefore collect the offline CDR charging information and feed the charging information to the rating engine(s) 425, 430, 435, which may immediately determine the call cost. The call cost information may be added to the unrated CDR to form a rated CDR, which may be passed to the billing domain and transported to the desired conclusion in less than 1 second. For another example, the rating engines 425, 430, 435 may perform near real time charging with a relatively short delay if the offline chargeable event and/or session is associated with the near real-time rating control category. The pre-biller component 405 may therefore collect the offline CDR charging information and feed the charging information to the rating engine(s) 425, 430, 435, which may determine the call cost within a selected time period. For example, the rated CDR containing the call cost information may be passed to the billing domain and transported to the desired conclusion in less then 1 minute. For the offline chargeable events and/or sessions associated with the non-real-time rating control category, the rating engine(s) 425, 430, 435 may determine the call cost at a later time, such as a system specified time when the rating engine(s) 425, 430, 435 are not occupied with online charging calls. In one embodiment, the rated CDRs may be stored or queued in the CDR repository 410 before being provided to the billing domain. The pre-biller 405 may also send the rated CDR back to CGF for storage and file management over the Bx interface.

In one embodiment, the pre-biller component 405 may provide the off-line CDR to the rating engine(s) 425, 430, 435 at the selected time so that the rating engine(s) 425, 430, 435 can simply perform the call cost calculation in response to receiving the off-line CDR. For example, rated CDRs may be stored or queued in the CDR repository 410 until the selected time and then may be provided to the billing domain. However, the present invention is not limited to this embodiment. In one alternative embodiment, the pre-biller component 405 may provide the off-line CDR to the rating engine(s) 425, 430, 435 as soon as the off-line CDR is available and the off-line CDR may be stored or queued. The pre-biller component 405 may also provide information indicative of the rating timer control category associated with the off-line CDR. The rating engine(s) 425, 430, 435 may then determine the appropriate time to perform the call cost calculation based upon the rating timer control category and may perform the call cost calculation at the determined time. For example, the Ro and Re interfaces may be extended to include an optional rating control timer AVP. The optional rating control timer AVP enables the pre-biller component 405 to indicate whether the online charging system and/or the rating engine(s) 425, 430, 435 should perform the rating in real time, near real time, or non real time during off-peak time.

Figure 6:
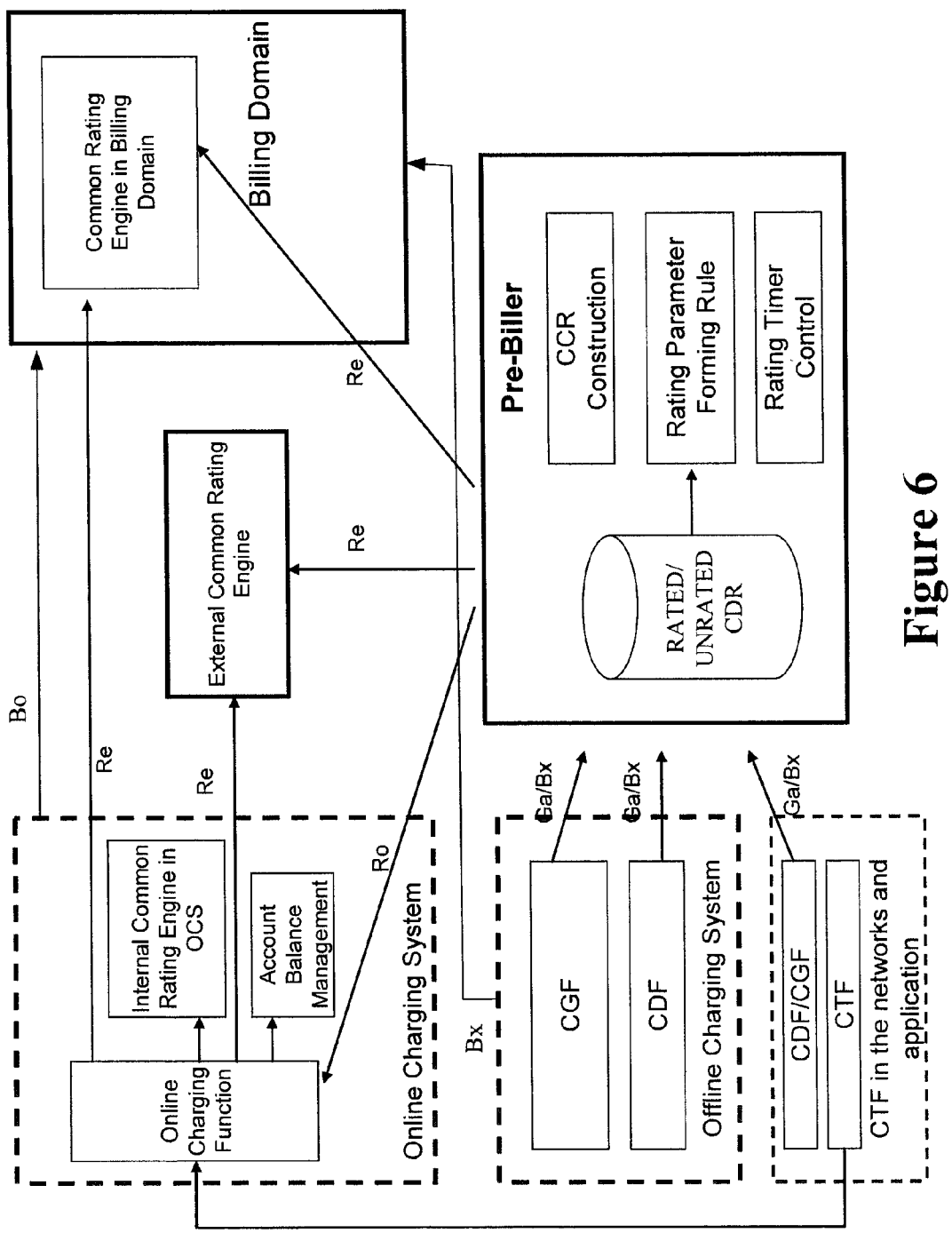
FIG. 6 conceptually illustrates one exemplary embodiment wherein the pre-biller is implemented as the standalone box, in accordance with the present invention.
Figure 7:
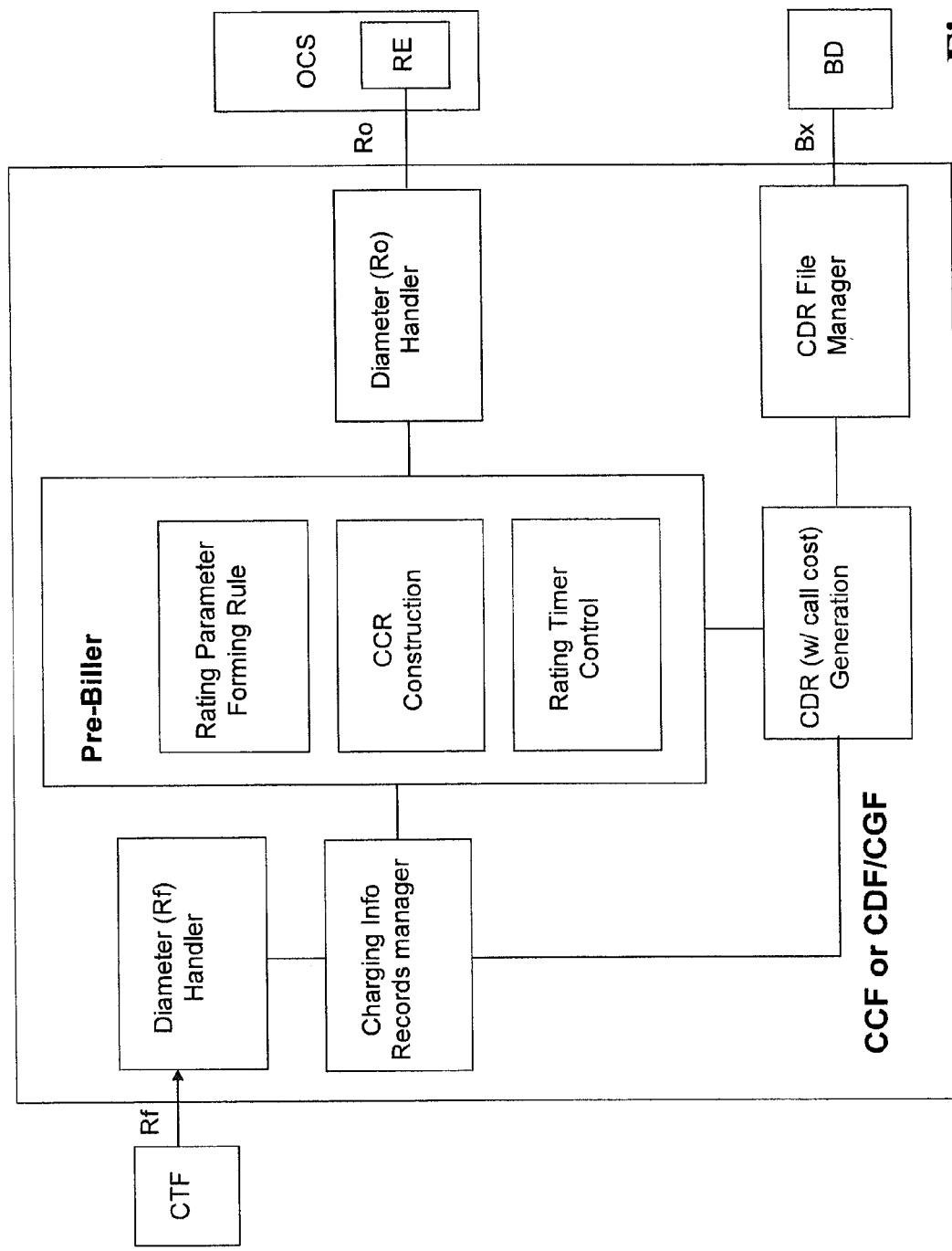
FIG. 7 conceptually illustrates one exemplary embodiment wherein the pre-biller is integrated within a CCF or CDF/CGF box, in accordance with the present invention.

As discussed above, the pre-biller component 405 may be implemented as a stand-alone entity or may be implemented in other elements of the charging architecture 400. FIG. 6 conceptually illustrates one exemplary embodiment wherein the pre-biller is implemented as the standalone box. FIG. 7 conceptually illustrates one exemplary embodiment wherein the pre-biller is integrated with CCF or CDF/CGF box. In the embodiment shown in FIG. 7, the pre-biller component 405 communicates with OCS (which includes an internal rating engine in this embodiment) via Ro interface. However, persons of ordinary skill in the art having benefit of the present disclosure should appreciate that the embodiments depicted in FIG. 6 and FIG. 7 are intended to be illustrative and not to limit the present invention. In various alternative embodiments, the pre-biller component can be a standalone box, can be integrated within an IMS CCF or CDF/CGF box, or could be integrated within the legacy CDF components of a SGSN/GGSN box. The pre-biller interface also supports Ro and Re interfaces to communicate the various rating engine solutions, which can be located in online charging system (OCS), billing domain, or 3$^{rd}$ party separated rating engine.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of processing information associated with off-line billed communications in a communications network, comprising:
providing at least one charging data record from a pre-biller to a rating engine via an online charging system in response to receiving said at least one charging data record from an off-line charging system, wherein said at least one charging data record includes information associated with at least one off-line chargeable event or session, and wherein said at least one charging data record is associated with at least one time control category
that indicates whether the rating engine is to modify said at least one charging data record in real-time, near-real time, or non-real time, and wherein modifying said at least one charging data record comprises modifying said at least one charging data record to include information indicative of said at least one cost of said at least one off-line chargeable event or session.

2. The method of claim 1, comprising receiving said at least one charging data record from the offline charging system.

3. The method of claim 2, wherein receiving said at least one charging data record comprises receiving at least one charging data record lacking information indicative of said at least one cost of said at least one off-line chargeable event or session.

4. The method of claim 1, comprising determining said at least one time control category associated with said at least one charging data record.

5. The method of claim 4, wherein determining said at least one time control category comprises determining said at least one time control category based on at least one of a latency and a delay associated with said at least one off-line chargeable event or session.

6. The method of claim 5, wherein determining said at least one time control category comprises determining at least one of a real-time rating control category indicating that the rating engine is to modify said at least one charging data record with a latency or delay of less than one second, a near real-time rating control category indicating that the rating engine is to modify said at least one charging data record with a latency or delay of less than one minute, and a non-real-time rating control category that does not limit the latency or delay for modification of said at least one charging data record.

7. The method of claim 4, wherein determining said at least one time control category comprises determining said at least one time control category based on at least one charging rule.

8. The method of claim 7, wherein determining said at least one time control category based on said at least one charging rule comprises determining said at least one time control category based on at least one charging rule that associates at least one service type with at least one time control category.

9. The method of claim 1, wherein providing said at least one charging data record to the rating engine comprises providing said at least one charging data record to the rating engine at the time determined based on said at least one time control category associated with said at least one charging data record.

10. The method of claim 1, wherein providing said at least one charging data record to the rating engine comprises providing information indicative of said at least one time control category so that the rating engine can determine said at least one cost at the time determined based on said at least one time control category.

11. The method of claim 1, wherein providing said at least one charging data record to the rating engine comprises providing said at least one charging data record to a rating engine that is configured to determine costs for off-line chargeable events or sessions and online chargeable events or sessions.

12. The method of claim 1, comprising buffering said at least one modified charging data record.

13. The method of claim 1, comprising providing said at least one modified charging data record to a billing system.

14. A method of processing information associated with off-line billed chargeable events or sessions in a communications network, comprising:
- receiving, at a rating engine, at least one charging data record including information associated with at least one off-line chargeable event or session, said at least one charging data record having been provided in response to said at least one charging data record being received at a pre-biller;
- determining, at the rating engine, at least one cost of said at least one off-line chargeable event or session, said at least one cost being determined in real-time, near-real-time, or non-real-time depending on at least one time control category associated with said at least one charging data record; and
- providing, from the rating engine, information indicative of said at least one determined cost.

15. The method of claim 14, wherein determining said at least one cost comprises determining said at least one cost at a time that said at least one charging data record is received, the reception time of the charging data record being determined based on said at least one time control category associated with said at least one charging data record.

16. The method of claim 14, wherein determining said at least one cost comprises:
- receiving information indicative of said at least one time control category; and
- determining said at least one cost at a time determined based on said at least one time control category.

17. The method of claim 14, comprising determining at least one cost of at least one online chargeable event or session.

18. The method of claim 17, wherein determining said at least one cost comprises:
- determining said at least one cost with a latency or delay of less than one second when said at least one time control category indicates that said at least one cost is to be determined in real time; and
- determining said at least one cost with a latency or delay of less than one minute when said at least one time control category indicates that said at least one cost is to be determined in near real time.

* * * * *